US008339970B2

(12) United States Patent
Tailor

(10) Patent No.: US 8,339,970 B2
(45) Date of Patent: Dec. 25, 2012

(54) SYSTEM AND METHOD FOR NETWORK OPTIMIZATION

(75) Inventor: Pinalkumari Tailor, Ashburn, VA (US)

(73) Assignee: Clearwire IP Holdings

( * ) Notice: Subject to any disclaimer, the term of this patent is extended or adjusted under 35 U.S.C. 154(b) by 447 days.

(21) Appl. No.: 12/753,663

(22) Filed: Apr. 2, 2010

(65) Prior Publication Data

US 2011/0242987 A1    Oct. 6, 2011

(51) Int. Cl.
*H04L 12/26* (2006.01)
*G06F 11/00* (2006.01)
*H04W 36/30* (2009.01)

(52) U.S. Cl. ........ 370/242; 370/216; 370/332; 370/252; 455/423; 455/436

(58) Field of Classification Search .................. 370/242, 370/252, 216, 217–225, 331, 332, 328, 338; 455/423, 436
See application file for complete search history.

(56) References Cited

U.S. PATENT DOCUMENTS

| | | | | |
|---|---|---|---|---|
| 7,602,707 | B2 * | 10/2009 | Guo et al. ..................... | 370/229 |
| 7,782,787 | B2 * | 8/2010 | Karol et al. ................... | 370/248 |
| 8,165,028 | B1 * | 4/2012 | Yuhan et al. .................. | 370/242 |
| 2009/0046573 | A1 * | 2/2009 | Damnjanovic ................ | 370/216 |
| 2009/0088131 | A1 * | 4/2009 | Gholmieh et al. ............ | 455/410 |
| 2009/0103511 | A1 * | 4/2009 | Marinier et al. .............. | 370/345 |
| 2009/0163238 | A1 * | 6/2009 | Rao et al. ...................... | 455/522 |
| 2010/0054146 | A1 * | 3/2010 | Rudland et al. ............... | 370/252 |
| 2011/0212720 | A1 * | 9/2011 | Hamalainen et al. ......... | 455/423 |

* cited by examiner

*Primary Examiner* — Kwang B Yao
*Assistant Examiner* — Candal Elpenord
(74) *Attorney, Agent, or Firm* — Michael J. Donohue; Davis Wright Tremaine LLP

(57) ABSTRACT

A mobile station (MS) used in a wireless communication system collects communication metrics data during a call session and stores the communication metrics data in the MS at the time that a session is disrupted. When a new communication link is established, the MS transmits the stored communication metrics. The communication metrics and other data relating to the disrupted communication session may be analyzed to determine which communication metrics were operating at abnormal values and determine the probability that a particular communication metric was related to the cause of the session disruption. The communication metrics values and probability metrics values may be used to determine a likely cause for the session disruption.

28 Claims, 14 Drawing Sheets

| SESSION DROPS | PROBABILITY | COVERAGE ISSUES | INTERFERENCE MANAGEMENT | HARDWARE FAILURE | BACKHAUL CAPACITY | CORE ISSUES |
|---|---|---|---|---|---|---|
| RSSI | | | | | | |
| CINR | | | | | | |
| MOBILE TX PWR | | | | | | |
| PER | | | | | | |
| NUMBER OF RE-TRANSMISSIONS | | | | | | |
| NEIGHBOR RSSI (dBm) | | | | | | |
| NEIGHBOR CINR | | | | | | |
| RTT | | | | | | |
| RANGING FAILURE | | | | | | |
| BANDWIDTH CAPABILITY NEGOTIATION FAILURE | | | | | | |
| AUTHENTICATION FAILURE | | | | | | |
| REGISTRATION FAILURE | | | | | | |
| DYNAMIC SERVICE RELATED NEGOTIATION FAILURE | | | | | | |
| INTERHA IP ASSIGNMENT ISSUE | | | | | | |
| JITTER | | | | | | |
| CALL SIGNATURES SHOWING ABNORMALLY INCREMENTED VALUES ↑ CALL SIGNATURES SHOWING DECREMENTED VALUES ↓ PROBABILITY WILL BE IN FORM OF H=HIGH, M=MEDIUM, L=LOW | | | | | | |

FIG.3

| SESSION DROPS | PROBABILITY | COVERAGE ISSUES | INTERFERENCE MANAGEMENT | HARDWARE FAILURE | BACKHAUL CAPACITY | CORE ISSUES |
|---|---|---|---|---|---|---|
| RSSI | H ↓ | X | | | | |
| CINR | H ↓ | X | | | | |
| MOBILE TX PWR | H ↑ | X | | | | |
| PER | H ↑ | X | | | | |
| NUMBER OF RE-TRANSMISSIONS | L | | | | | |
| NEIGHBOR RSSI (dBm) | L | | | | | |
| NEIGHBOR CINR | L | | | | | |
| RTT | H ↑ | X | | | | |
| RANGING FAILURE | H ↑ | X | | | | |
| BANDWIDTH CAPABILITY NEGOTIATION FAILURE | L | | | | | |
| AUTHENTICATION FAILURE | L | | | | | |
| REGISTRATION FAILURE | L | | | | | |
| DYNAMIC SERVICE RELATED NEGOTIATION FAILURE | L | | | | | |
| INTERHA IP ASSIGNMENT ISSUE | L | | | | | |
| JITTER | M | | | | | |
| CALL SIGNATURES SHOWING ABNORMALLY INCREMENTED VALUES ↑ ||||||||
| CALL SIGNATURES SHOWING DECREMENTED VALUES ↓ ||||||||
| PROBABILITY WILL BE IN FORM OF H=HIGH, M=MEDIUM, L=LOW ||||||||

FIG.4

| SESSION DROPS | PROBABILITY | COVERAGE ISSUES | INTERFERENCE MANAGEMENT | HARDWARE FAILURE | BACKHAUL CAPACITY | CORE ISSUES |
|---|---|---|---|---|---|---|
| RSSI | L | | | | | |
| CINR | H ↓ | | X | | | |
| MOBILE TX PWR | H ↑ | | X | | | |
| PER | H ↑ | | X | | | |
| NUMBER OF RE-TRANSMISSIONS | H ↑ | | X | | | |
| NEIGHBOR RSSI (dBm) | L | | | | | |
| NEIGHBOR CINR | H ↑ | | X | | | |
| RTT | L | | | | | |
| RANGING FAILURE | H ↑ | | X | | | |
| BANDWIDTH CAPABILITY NEGOTIATION FAILURE | L | | | | | |
| AUTHENTICATION FAILURE | L | | | | | |
| REGISTRATION FAILURE | L | | | | | |
| DYNAMIC SERVICE RELATED NEGOTIATION FAILURE | L | | | | | |
| INTERHA IP ASSIGNMENT ISSUE | L | | | | | |
| JITTER | M | | | | | |
| CALL SIGNATURES SHOWING ABNORMALLY INCREMENTED VALUES ↑ | | | | | | |
| CALL SIGNATURES SHOWING DECREMENTED VALUES ↓ | | | | | | |
| PROBABILITY WILL BE IN FORM OF H=HIGH, M=MEDIUM, L=LOW | | | | | | |

FIG. 7

| SESSION DROPS | PROBABILITY | COVERAGE ISSUES | INTERFERENCE MANAGEMENT | HARDWARE FAILURE | BACKHAUL CAPACITY | CORE ISSUES |
|---|---|---|---|---|---|---|
| RSSI | L | | | | | |
| CINR | L | | | | | |
| MOBILE TX PWR | L | | | | | |
| PER | H ↑ | | | X | | |
| NUMBER OF RE-TRANSMISSIONS | H ↑ | | | X | | |
| NEIGHBOR RSSI (dBm) | L | | | | | |
| NEIGHBOR CINR | L | | | | | |
| RTT | L | | | | | |
| RANGING FAILURE | H ↑ | | | X | | |
| BANDWIDTH CAPABILITY NEGOTIATION FAILURE | H ↑ | | | X | | |
| AUTHENTICATION FAILURE | L | | | | | |
| REGISTRATION FAILURE | L | | | | | |
| DYNAMIC SERVICE RELATED NEGOTIATION FAILURE | L | | | | | |
| INTERHA IP ASSIGNMENT ISSUE | L | | | | | |
| JITTER | H ↑ | | | X | | |
| CALL SIGNATURES SHOWING ABNORMALLY INCREMENTED VALUES ↑ CALL SIGNATURES SHOWING DECREMENTED VALUES ↓ PROBABILITY WILL BE IN FORM OF H=HIGH, M=MEDIUM, L=LOW | | | | | | |

FIG.8

| SESSION DROPS | PROBABILITY | COVERAGE ISSUES | INTERFERENCE MANAGEMENT | HARDWARE FAILURE | BACKHAUL CAPACITY | CORE ISSUES |
|---|---|---|---|---|---|---|
| RSSI | L | | | | | |
| CINR | L | | | | | |
| MOBILE TX PWR | L | | | | | |
| PER | H ↑ | | | | X | |
| NUMBER OF RE-TRANSMISSIONS | H ↑ | | | | X | |
| NEIGHBOR RSSI (dBm) | L | | | | | |
| NEIGHBOR CINR | L | | | | | |
| RTT | L | | | | | |
| RANGING FAILURE | L | | | | | |
| BANDWIDTH CAPABILITY NEGOTIATION FAILURE | H ↑ | | | | X | |
| AUTHENTICATION FAILURE | L | | | | | |
| REGISTRATION FAILURE | L | | | | | |
| DYNAMIC SERVICE RELATED NEGOTIATION FAILURE | H ↑ | | | | X | |
| INTERHA IP ASSIGNMENT ISSUE | L | | | | | |
| JITTER | H ↑ | | | | X | |

CALL SIGNATURES SHOWING ABNORMALLY INCREMENTED VALUES ↑
CALL SIGNATURES SHOWING DECREMENTED VALUES ↓
PROBABILITY WILL BE IN FORM OF H=HIGH, M=MEDIUM, L=LOW

FIG.9

| SESSION DROPS | PROBABILITY | COVERAGE ISSUES | INTERFERENCE MANAGEMENT | HARDWARE FAILURE | BACKHAUL CAPACITY | CORE ISSUES |
|---|---|---|---|---|---|---|
| RSSI | L | | | | | |
| CINR | L | | | | | |
| MOBILE TX PWR | L | | | | | |
| PER | H ↑ | | | | | X |
| NUMBER OF RE-TRANSMISSIONS | H ↑ | | | | | X |
| NEIGHBOR RSSI (dBm) | L | | | | | |
| NEIGHBOR CINR | L | | | | | |
| RTT | H ↑ | | | | | X |
| RANGING FAILURE | L | | | | | |
| BANDWIDTH CAPABILITY NEGOTIATION FAILURE | L | | | | | |
| AUTHENTICATION FAILURE | H ↑ | | | | | X |
| REGISTRATION FAILURE | H ↑ | | | | | X |
| DYNAMIC SERVICE RELATED NEGOTIATION FAILURE | H ↑ | | | | | X |
| INTERHA IP ASSIGNMENT ISSUE | H ↑ | | | | | X |
| JITTER | H ↑ | | | | | X |
| CALL SIGNATURES SHOWING ABNORMALLY INCREMENTED VALUES ↑ | | | | | | |
| CALL SIGNATURES SHOWING DECREMENTED VALUES ↓ | | | | | | |
| PROBABILITY WILL BE IN FORM OF H=HIGH, M=MEDIUM, L=LOW | | | | | | |

FIG.10

SYSTEM AND METHOD FOR NETWORK OPTIMIZATION

BACKGROUND OF THE INVENTION

1. Field of the Invention

The present invention is directed generally to network optimization and, more particularly, to a system and method for determining the cause of session drops and techniques for optimizing the network to reduce session drops.

2. Description of the Related Art

A wireless session is created when a remote unit has successfully completed the network entry process. For a WiMAX wireless network, the network entry process includes successful initial ranging, an exchange of basic capabilities authentication, registration, internet protocol (IP) assignment and a dynamic service addition (DSA) with the network. For other wireless networks, the specific exchange of data to create a session may differ, but the principles are the same.

Generally, a session drop occurs when the mobile unit abruptly terminates (or gets terminated) from the serving site due to some unavoidable circumstances. In a WiMAX wireless network, a session drop occurs primarily when a registered mobile unit does not respond to a DEREG-CMD (or never receives one) sent out by the RAS following a period of inactivity. Specifically, all MS initial entries, following by active state, that are not preceded by a successful MSD registration, are considered to be session drops.

What is needed is a technique for analyzing session drops to permit network optimization with the goal of reducing session drops. The present disclosure provides this and other advantages as will be apparent from the following detailed description and accompanying figures.

BRIEF DESCRIPTION OF THE SEVERAL VIEWS OF THE DRAWING(S)

FIG. 3 illustrates a communication metrics data table.

FIG. 4 illustrates the communication metrics data table of FIG. 3 with the data completed to indicate a session drop caused by poor coverage.

FIGS. 7-10 illustrate communication metrics data tables completed to indicate session drops resulting from various other causes.

DETAILED DESCRIPTION OF THE INVENTION

The present disclosure is directed to techniques for automatically gathering information on session drops and categorizing the session drops so as to determine the probable cause for signal loss.

Current technologies rely on the service provider/engineer to manually generate a "trouble" report and manually evaluate the issue. If a device becomes disconnected from the network and call drops, any reasons for the session drop are unknown to the service provider unless the service provider initiates a manual troubleshooting process. Current network optimization techniques are not automated and are thus very time consuming for the service provider. As a result of this cumbersome process, the service provider has no mechanism to identify patterns in call drops and escalate the issue to the point where the need for optimization is recognized and evaluated.

In contrast, as will be described in greater detail below, the system and method described herein automatically identify the likely reason for session drops and direct attention to the correct optimization activity. The system automatically collects signal metrics provided by mobile units and performs an analysis process to determine the cause for session drops.

While the examples presented herein are directed to WiMAX wireless networks, one skilled in the art will appreciate that the techniques may readily be applied to any wireless network. Accordingly, the present disclosure is not intended to be limited only to WiMAX networks.

A session drop may occur due to a number of reasons. The most common reasons for a session drop are:

1. poor radio frequency (RF) coverage;
2. strong interference;
3. hardware performance issue;
4. sudden network congestion and backhaul issues; and
5. core malfunction.

Figure 1:
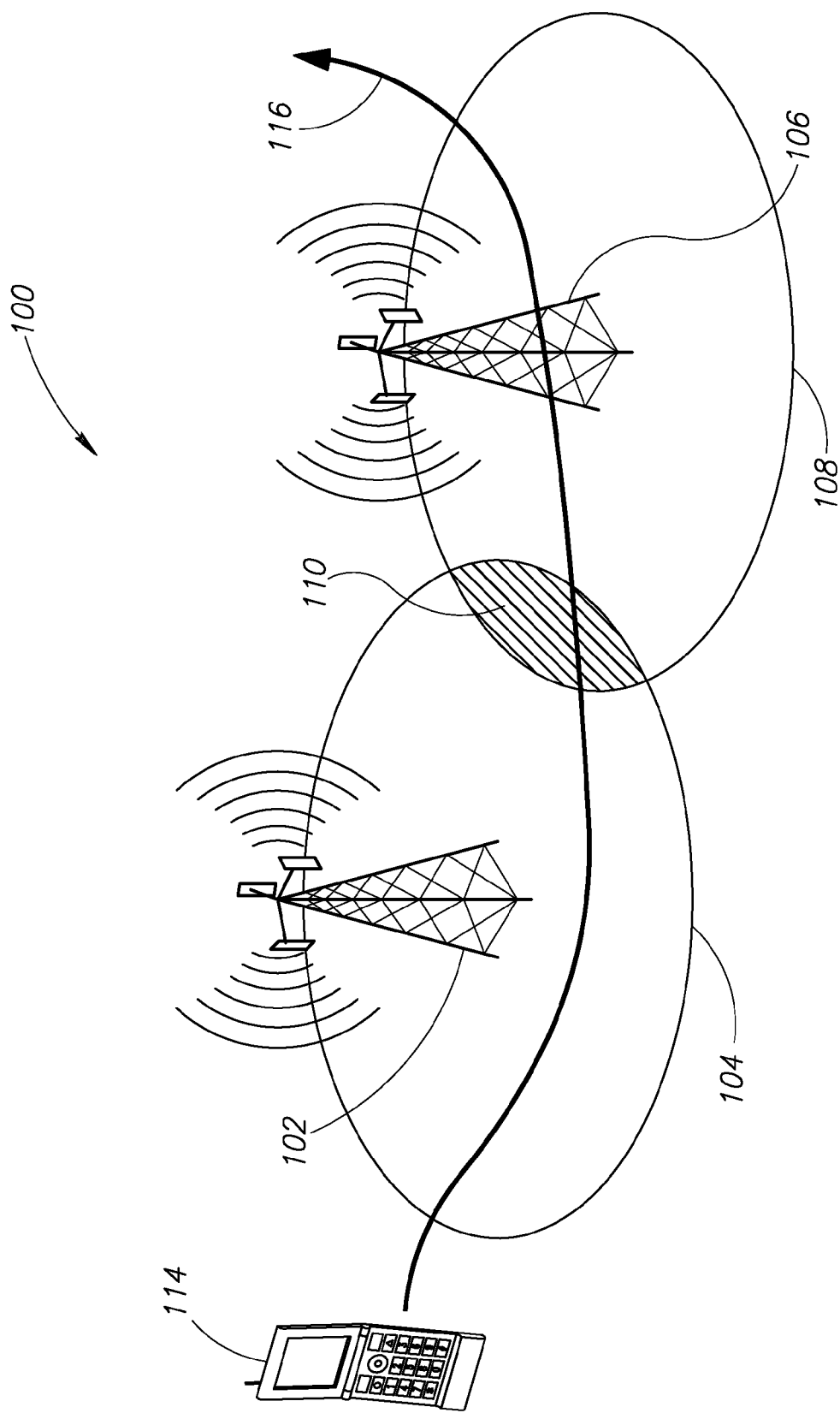
FIG. 1 illustrates a simplified wireless network with a session drop caused by poor coverage.

FIG. 1 illustrates an example network architecture 100 to illustrate an example of a session drop due to poor coverage. In FIG. 1, a base station (BS) 102 has a coverage area 104 while an adjoining BS 106 has a coverage area 108. As is common in wireless networks, the network architecture 100 illustrates an overlapping area of coverage 110 where the coverage areas 104 and 108 overlap. Those skilled in the art will appreciate that a normal network architecture includes many more base stations and areas of coverage and serves a large number of mobile devices. However, to illustrate the nature of the technology disclosed herein, the network architecture 100 of FIG. 1 is simplified to include only the base stations 102 and 106.

A mobile station (MS) 114 travels along a path of travel 116 through the coverage area 104 and the coverage area 106. Those skilled in the art will appreciate that the MS 114 may alternatively be referred to as a cell phone, a remote unit, a remote device, a mobile device, laptop, mobile computer, web computer or the like. The present disclosure is not limited by the specific terminology used to implement the MS 114.

As the MS 114 travels through the coverage area 104, it communicates with the BS 102. As the MS 114 enters the overlapping coverage area 110, the signal quality tends to decrease. As the MS 114 experiences very poor RF signal quality, it may be unable to continue with data transmission. In this scenario, the BS 102 transmits a DEREG-CMD message to the MS 114, but never receives a response to the DEREG-CMD message. The BS 102 does not receive a response to the DEREG-CMD message either because the MS 114 did not receive the command message (due to poor signal quality on the downlink) or that the response to the DEREG-CMD message was never received by the BS 102 (due to poor signal quality on the uplink).

Failure to respond to the DEREG-CMD message will initiate an idle mode timer. When the idle mode time in the BS 102 times out, the BS 102 declares a session drop and will free the allocated resources for use with other mobile stations (not shown).

In the meantime, the MS 114 also uses an idle mode timer that begins timing upon the last receipt of data from BS 102. When the idle timer times out, the MS 114 recognizes that it is no longer in communication with the BS 102 and declares a session disconnect. In that event, the MS 114 will initiate attempts to get an uplink synchronization either to the BS 102 or a neighboring base station, such as the BS 106. As will be discussed in greater detail below, the MS 114 automatically stores a series of measurement values or communication metrics in a storage location within the mobile station. This data will be analyzed to determine the cause for the session drop. The nature of the stored communication metrics and its use will be discussed below.

Figure 2:
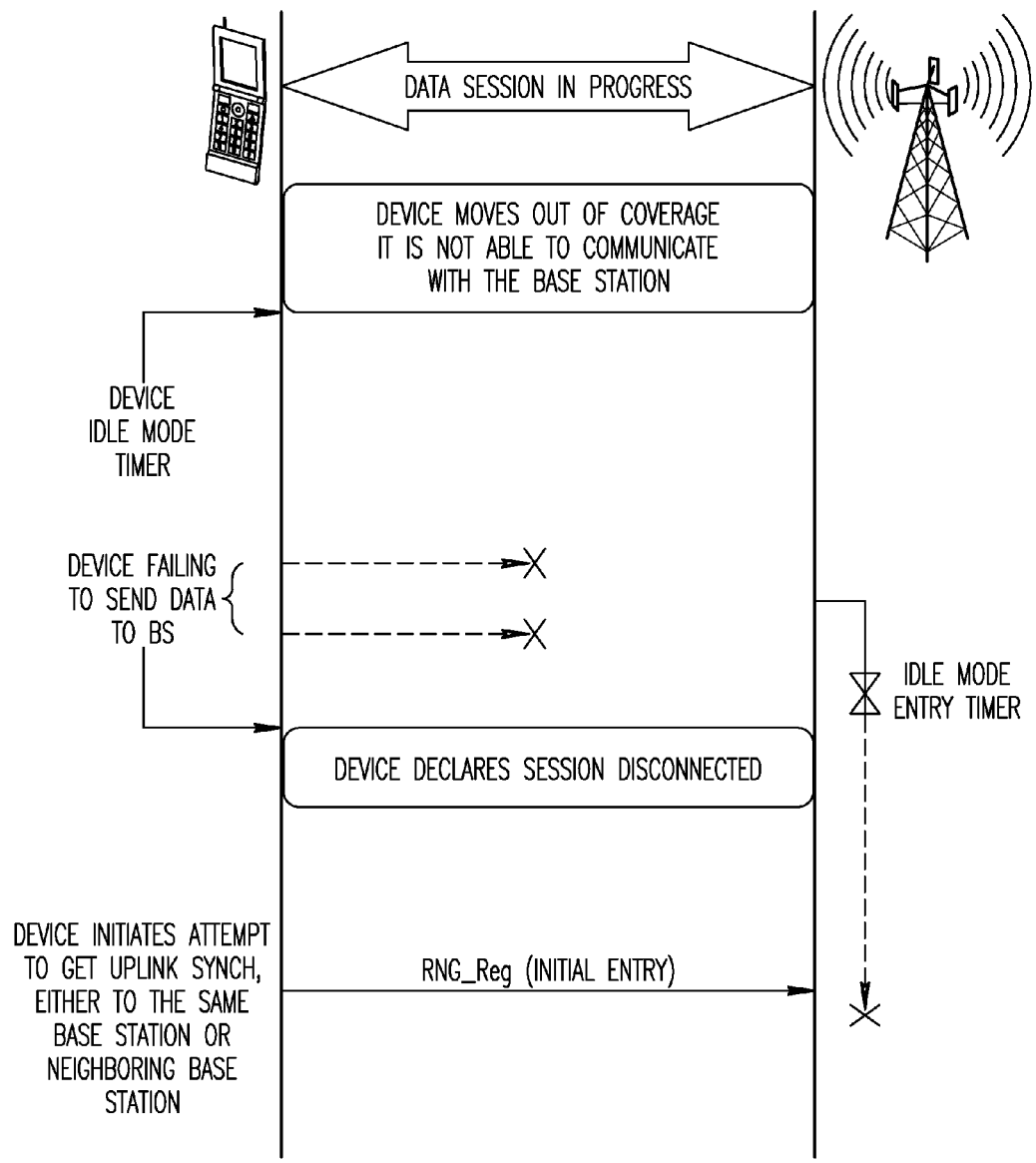
FIG. 2 illustrates a message exchange between a mobile unit and a base station during a session drop caused by poor coverage.

FIG. 2 illustrates a message exchange between the MS 114 and the BS 102 during a data session and communication messages that occur when the session is dropped. At the top of FIG. 2, a data session is in progress and data is exchanged between the MS 114 and the BS 102. As the MS 114 moves out of range, it can no longer communicate with the BS 102. When the idle mode timer in the MS 114 times out, the MS declares a session disconnect and attempts to reconnect with the wireless network. At the bottom of FIG. 2, the MS 114 transmits a request for initial entry using a ranging request (RNG_Req) message that will, ideally, be detected by at least one in the wireless communication network.

In the example illustrated in FIG. 1, the MS 114 transmits the RNG_Req message that will likely be detected by the BS 106. It is possible that the MS 114 will reacquire the BS 102. If the MS 114 reacquires the BS 102, the base station will recognize that the mobile station was recently dropped. However, if the MS is reacquired by the BS 106, the base station has no information indicating that the reacquisition is the result of a dropped session. From the perspective of the BS 106, this is a new call. Upon completion of the complete network re-entry process, the MS 114 will report a number of communication metrics to the currently serving base station (e.g., either the BS 102 or the BS 106). If the BS 106 receives the communication metrics from the MS 114, the base station will now recognize that the current data session is the result of a previously dropped session. In an exemplary embodiment, the base station that receives the communication metrics report and relays the communication metrics to the previously-serving base station (e.g., the BS 102) using a network backhaul (not shown). In the example in FIG. 1, the BS 102 receives the communication metrics and creates a probability metric chart. An example of such a chart is illustrated in the table of FIG. 3. The communication metrics are data generated within the MS 114 during normal operation and may be periodically transmitted to the serving base station (e.g., the BS 102). The conventional mobile station does not store this data or relay the data to a base station upon re-acquisition.

Changes in the communication metrics are used to determine the reason for the session drop. The combination of communication metrics and probability metrics are used to determine the most likely cause of the session drop.

In the example illustrated in FIG. 1, the BS 102 receives the communication metrics from the MS 114 either directly or via the BS 106. The data in FIG. 4 illustrates the communication metrics for the scenario of FIG. 1 where the session was dropped due to poor coverage. As illustrated in FIG. 4, the MS 114 experienced an abnormal decrease in the RSSI and CINR. As those skilled in the art will appreciate, the term "abnormal" refers to data values that are outside the normal expected range of values for that parameter during normal operation. For example, the "normal" value for RSSI may range from −65 dbm to −80 dbm. RSSI values that fall below −80 dbm may be considered abnormal. Similarly, the other communication metrics illustrated in FIG. 4 are either above or below the range that is considered satisfactory for normal operation. In addition to abnormal values for RSSI in CINR, the MS 1114 had an abnormal increase in mobile transmit power. The packet error rate (PER) also increased abnormally. Other factors showing an abnormal increase in FIG. 4 include the round trip time (RTT), which is the round trip time between the MS 114 and the served base station (i.e., the base station 102) as well as an increased ranging failure.

As part of its analysis, the BS 102 determines the likely probability that the various factors in the communication metrics played a role in the session drop. These may be referred to as probability metrics. To determine such probability metrics the BS 102 can review data indicating changes in the communication metrics in the moments leading up to the call disruption. For example, the BS 102 can look at changes in RSSI in the moment preceding call disruption. If the value for RSSI fell below an average value a large number of time in the moments preceding call disruption, there is a higher probability that the decreased RSSI played a role in the call disruption. Similarly, a number of increases in mobile transmit power for the MS 114 in the moments leading up to call disruption may also indicate a high probability that the mobile transmit power was a factor in the call disruption. Thus, the BS 102 can determine a probability metric corresponding to each of the communication metrics. In an exemplary embodiment, the probability metrics may be categorized in classes, such as High, Medium, and Low probability for any particular communication metric. In the present case, as illustrated in FIG. 4, there is a relatively high probability that changes in the RSSI, CINR, Mobile TX Pwr, PER, RTT, and ranging failure played a major role in the session drop.

The combination of changes in the communication metrics and probability metrics can be identified as related to certain causes of a session drop. In the example of FIG. 4, the combination of changes in the communication metrics and probability metrics for RSSI, CINR, Mobile TX Pwr, RTT, and ranging failure all indicate problems with poor coverage. Those factors are indicated by the "X" in the column identified as a "Coverage Issue" in FIG. 4. Based on this automatically generated data, the BS 102 can determine that there was a coverage issue that caused the session drop with the MS 114. While a single incident of a session drop may not be cause for changes in the network architecture, the call metrics and probability metrics in FIG. 4 is essentially an automated trouble report. If other mobile stations (not shown) experience session drops in the overlapping coverage area 110 due to poor coverage, the service provider may identify this pattern as an indicator that changes to the network may be warranted.

Figure 5:
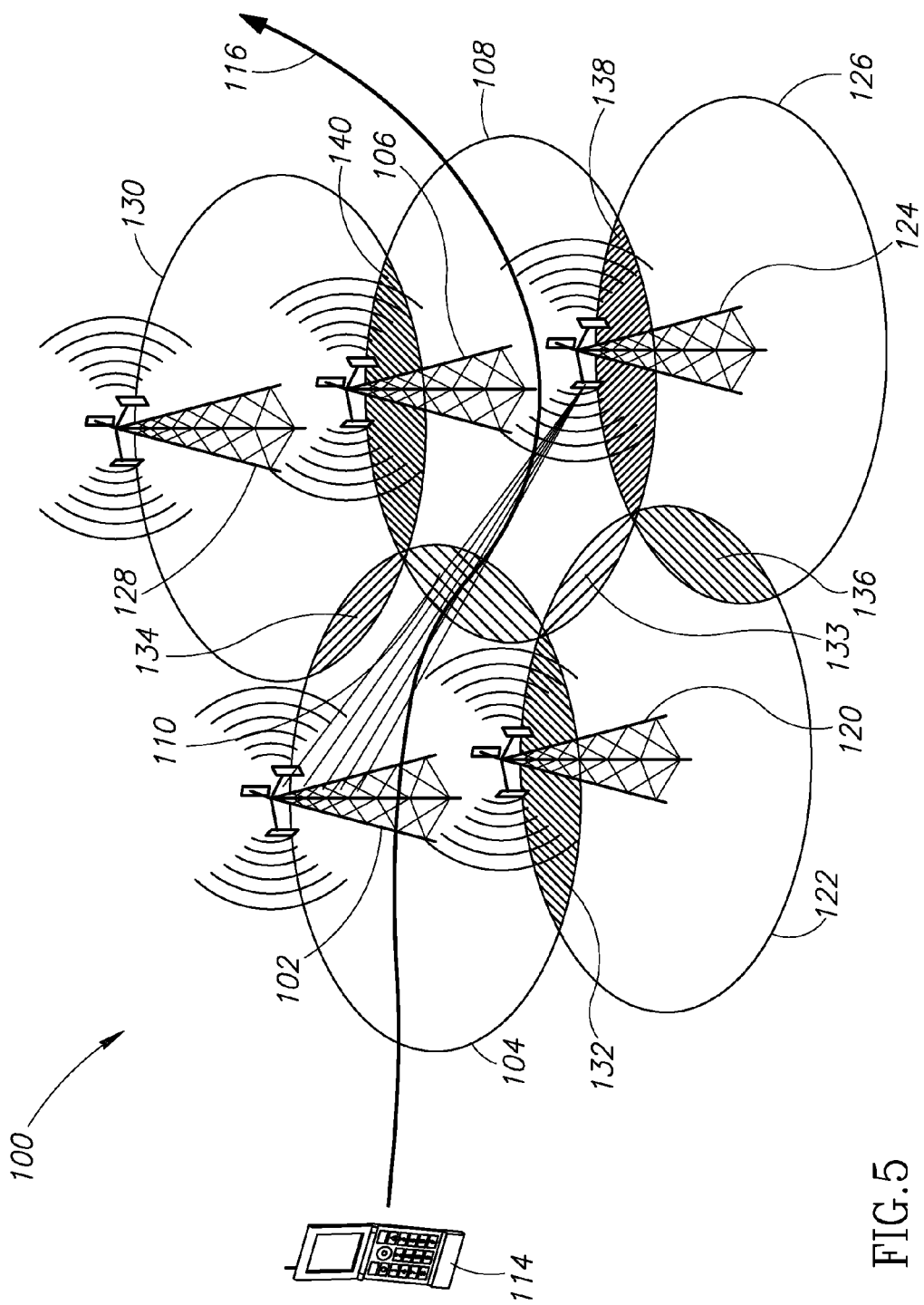
FIG. 5 illustrates a simplified wireless network with a session drop caused by interference.

FIG. 5 illustrates the network architecture 100 with additional base stations and areas of coverage to illustrate a session drop caused by interference. In addition to the base stations 102 and 106, FIG. 5 illustrates a BS 120 having a coverage area 122, a BS 124 having a coverage area 126, and a BS 128 having a coverage area 130. FIG. 5 also illustrates an overlapping coverage area 132 between the coverage area 104 and the coverage area 122 and an overlapping coverage area 133 between the coverage area 108 and the coverage area 122. An overlapping coverage area 134 also exists between the coverage area 104 and the coverage area 130. An overlapping coverage area 136 is illustrated between the coverage area 122 and the coverage area 126. An overlapping coverage area 138 exists between the coverage area 108 and the coverage area 126. Finally, an overlapping coverage area 140 is illustrated between the coverage area 108 and the coverage area 130. Although not explicitly illustrated with reference numbers in FIG. 5, there are some areas of overlapping coverage for the coverage areas of three base stations. Thus, the network architecture 100 includes multiple base stations with slightly overlapping areas of coverage in an effort to provide a wide geographical area of coverage to provide seamless coverage for a mobile station.

While the close proximity of base stations provides seamless coverage, it also increases the possibility that one base station will interfere with the operation of other base stations. In the example of FIG. 5, the BS 102 is currently communicating with the MS 114, but experiences interference from the BS 124. Such interference may occur if, for example, the RF signal from the BS 124 is overshooting and causes interference with nearby base stations (e.g., the BS 102). In such a scenario, the CINR of the serving base station (e.g., the BS 102) would experience an abnormal decrease. If the CINR for the MS 114 communicating with the BS 102 is too low, the session drops.

Figure 6:
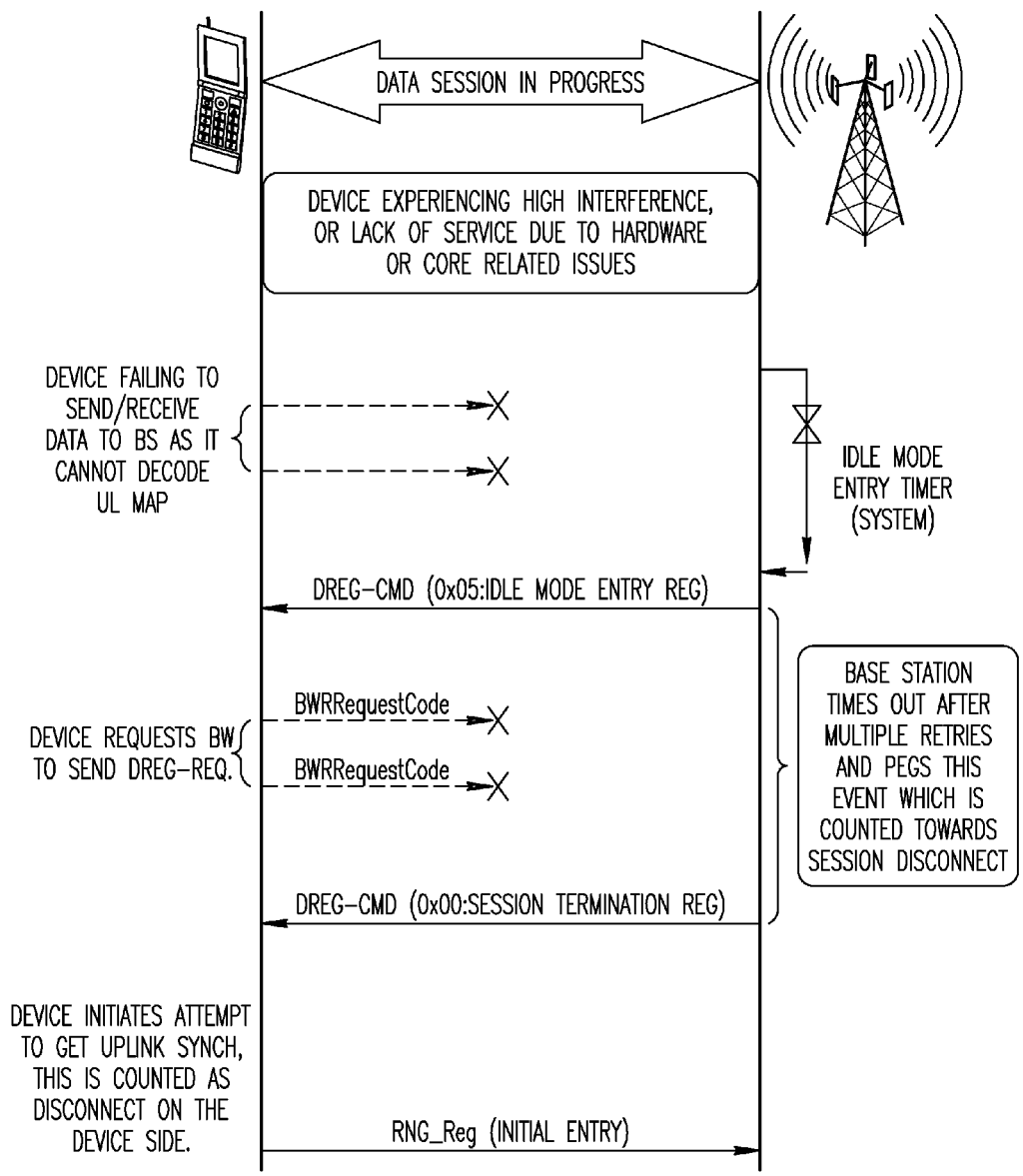
FIG. 6 illustrates a message exchange between a mobile unit and a base station during a session drop caused by interference.

FIG. 6 illustrates sample communications and message exchanges between the MS 114 and the BS 102 during a session dropped caused by interference. At the top of FIG. 4, a data session is in progress and data is exchanged between the MS 114 and the BS 102. At some point, the MS 114 and the BS 102 will experience high levels of interference. As a result of the interference, the MS 114 fails to send data to or receive data from the BS 102 and, likewise, the BS 102 cannot send data to or receive data from the MS 114.

After an idle mode timeout expires, the BS 102 sends a DREG-CMD message to the MS 114. If the interference is too great, the MS 114 will not receive the message. If the MS 114 does receive the DREG-CMD message, it will send a bandwidth request message (BWRequestCode). Again, interference typically would prevent receipt of the BWRequest-Code message from the MS 114. After the BS 102 attempts multiple retries, with no response from the MS 114, the base station declares a session disconnect and transmits a DREG-CMD message to terminate the session. Similarly, the MS 114 may also use an idle mode timer to begin timing from the moment of last data reception from the BS 102. When the timer in the MS 114 expires, the MS 114 will declare a dropped session. Because of the dropped session, the MS 114 will attempt to reacquire an uplink synchronization. This event is counted as a "disconnect" by the MS 114. The MS 114 transmits a ranging request (RNG_Req) message to reacquire a base station.

Upon reacquisition and registration with a base station (e.g., the BS 106 in FIG. 5), the MS 114 transmits the communication metrics data, as described above. FIG. 7 provides an example of the communication metrics and probability metrics for a session drop due to interference. As discussed above, the MS 114 will report the communication metrics to the currently serving base station (e.g., the BS 106). The base station that receives the communication metrics relays the data to the previously-served base station (e.g., the BS 102) using the network backhaul.

As illustrated in FIG. 7, there were no abnormal changes in the RSSI at the time the session was dropped. However, the CINR was abnormally low and the Mobile TX PwR was abnormally high. The low CINR may be indicative of interference. In addition, the neighbor CINR and the ranging failure in FIG. 7 were also abnormally high. These are characteristic of co-channel interference. As noted in FIG. 7, with the series of "X" in the interference management column, certain communication metrics parameters are indicative of interference as the cause of the session drop.

FIGS. 8-10 illustrate the communication metrics and the probability metrics for hardware failure related issues, backhaul related issues and poor functionality related issues, respectively. The abnormal increases or decreases in the communication metrics along with the probability metrics data can be used to automatically identify the likely failures that caused the session drops.

Figure 11:
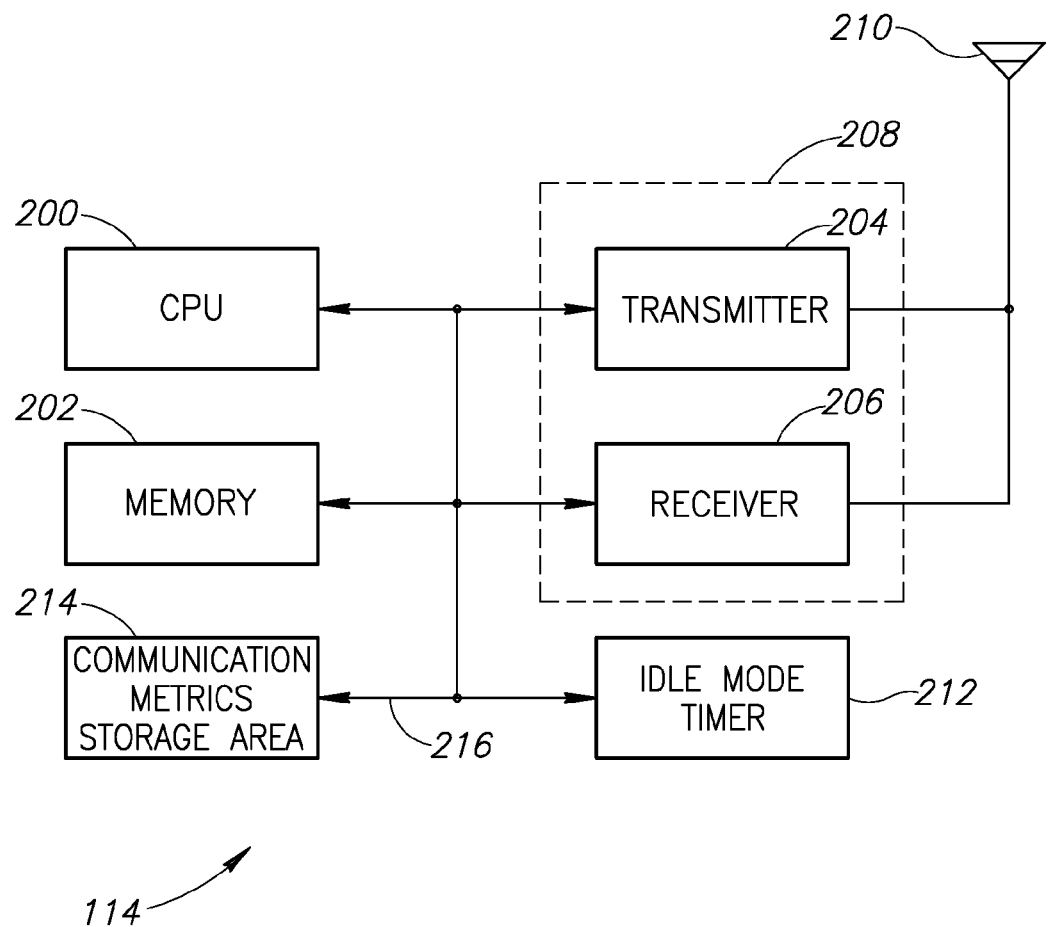
FIG. 11 is a functional block diagram of a mobile station used to collect and store communication metrics data.

FIG. 11 is a functional block diagram of the MS 114. The MS 114 includes a central processing unit (CPU) 200 and a memory 202. The CPU 200 may be implemented as a conventional microprocessor, microcontroller, or the like. Alternatively, the CPU 200 may be implemented as an application-specific integrated circuit, programmable gate array, discrete circuitry, or the like. The CPU 200 is not limited by the specific form of implementation. Similarly, the memory 202 may be implemented in many forms, such as read-only memory, random access memory, flash memory, or the like. In one embodiment, at least a portion of the memory 202 may be integrated into the CPU 200. In general, the memory stores data and instructions that are executed by the CPU 200.

FIG. 11 also illustrates a transmitter 204 and a receiver 206. In some embodiments, the transmitter 204 and receiver 206 may share circuitry and thus be implemented as a transceiver 208. The transceiver 208 is coupled to an antenna 210 to communicate with a base station in a conventional manner. Although operational characteristics of the transceiver 208 may vary depending on the specific form of the wireless communication network, the operation of the transceiver 208 is well known to those of ordinary skill in the art and need not be described in greater detail herein.

In addition, FIG. 11 illustrates an idle mode timer 212. As discussed above, the idle mode timer 212 measures time-out periods to aid the MS 114 in declaring a session disconnect. For example, the idle mode timer may begin timing when a prior communication is received from a base station (e.g., the BS 102). If further communication from a base station is not received by the end of the idle mode time period measured by the idle mode timer 212, the MS 114 determines that the session has been dropped and declares a session disconnect.

The MS 114 also includes a communication metrics storage area 214. In an exemplary embodiment, the communication metrics storage area 114 may be part of the memory 202. As is known in the art, the MS 114 commonly collects communication data in a form similar to that shown in FIG. 3 and periodically transmits the data to the serving base station (e.g., the BS 102). However, the communications data in the conventional wireless communication device is not stored beyond termination of the data session. In contrast, the MS 114 is configured to store the communication data in the communication metrics storage area 214. In this manner, if a session disconnect occurs, the most recent communication metrics have been stored, and will be retained by the MS 114 until the next time the MS 114 reconnects with the wireless communication network. Upon reconnection to the wireless communication network, either with the previously serving base station or with a new base station, the MS 114 transmits the data stored in the communication metrics storage area 214. This data is used to determine the likely cause for the session disruption.

The various components illustrated in FIG. 11 are coupled together by a bus system 216. The bus system 216 may include an address bus, data bus, control bus, power bus, and the like. For the sake of convenience, those various buses are illustrated in FIG. 11 as the bus system 216.

In one embodiment, the MS 114 may be a hand-held device, such as a "smart" phone. Alternatively, the MS 114 may be a laptop computer, network computer, or other form of computing device. In either embodiment, there are a number of conventional components, such as a display, keyboard, audio system, and the like, that are not illustrated in FIG. 11 because they are not critical to a proper understanding of the techniques described herein. However, those skilled in the art will appreciate that the MS 114, in any form of implementation, may include other conventional components.

Figure 12:
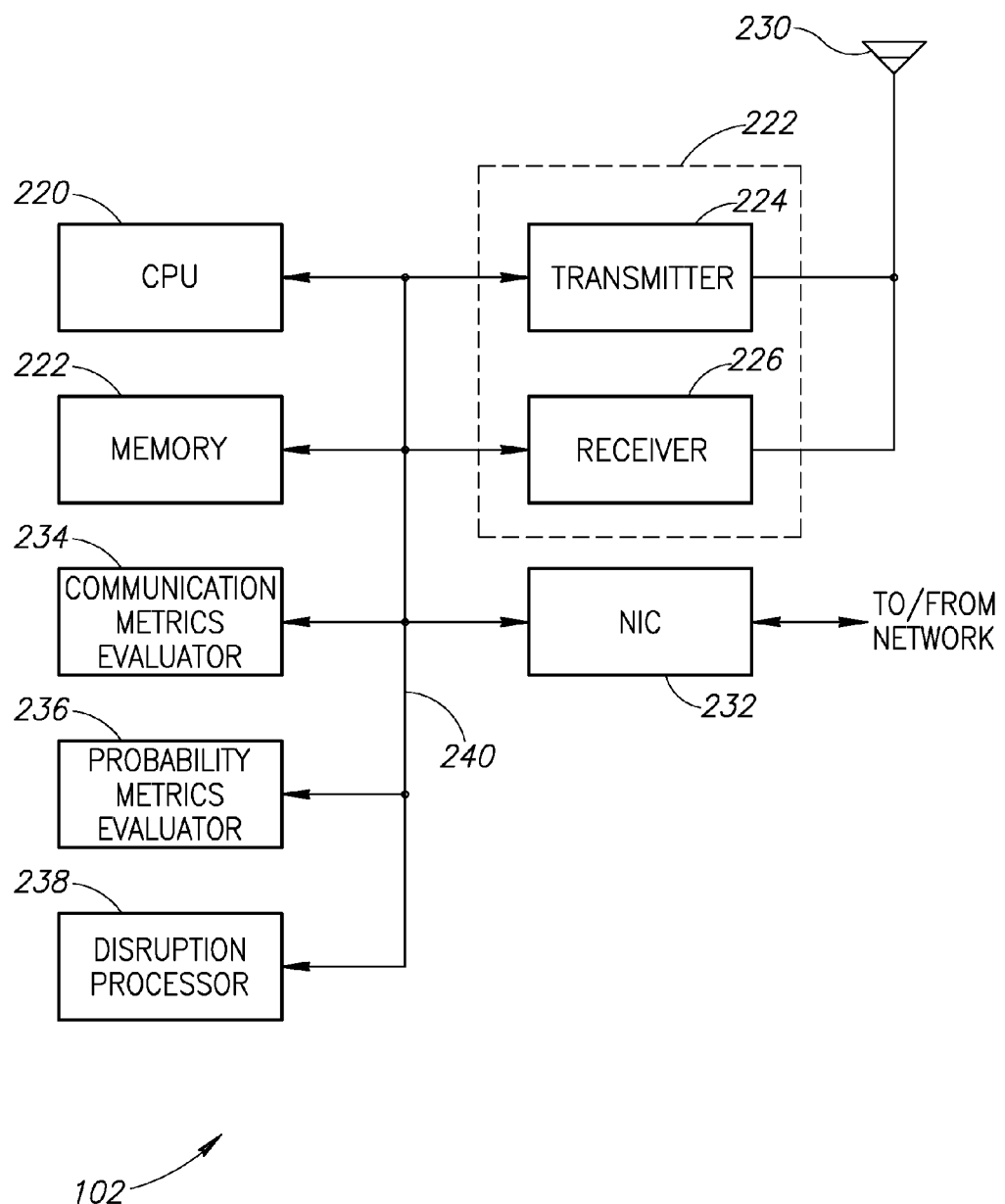
FIG. 12 is a functional block diagram of a base station used to evaluate communication metrics data.

FIG. 12 is a block diagram of the BS 102. Those skilled in the art will recognize that the functional block diagram of FIG. 12 may be equally applicable to any base station in the network architecture 100, such as the BS 106. The BS 102 includes a CPU 220 and memory 222. As discussed above with respect to the CPU 200 and memory 202, the CPU 220 and memory 222 may be implemented in a variety of different forms. The CPU 220 and memory 222 are not limited by the specific form of implementation.

Similarly, the BS 102 includes a transmitter 224 and receiver 226, which may be combined to form a transceiver 228. The transceiver 228 is coupled to an antenna 230. Generally speaking, the antenna 210 in the MS 114 is a small antenna that is often contained within the housing of the mobile station or a small stub antenna that protrudes from the housing. In contrast, the antenna 230 of the BS 102 is generally mounted on top of a cell phone tower. In addition, the transmitter 224 has a higher transmit output power than the transmitter 204 of the MS 114. However, the transceiver 222 and antenna 234 of the BS 102 are compatible for bi-directional communication with the transceiver 208 and the antenna 210 of the MS 114. As described above with respect to the transceiver 208 and antenna 210, the transceiver 228 and antenna 230 are intended to establish a wireless communication link between the BS 102 and one or more mobile stations (e.g., the MS 114). The operation of the transceiver 228 and antenna 230 are well known in the art and need not be described in greater detail herein.

The BS 102 also includes a network interface controller (NIC) 232 to permit communication between the base stations via the backhaul (not shown), and to permit communication between the BS 102 and a central network controller, such as an Element Management System (not shown). The NIC 232 is a conventional interface, such as an Ethernet controller, that need not be described in greater detail herein.

FIG. 12 also illustrates a communication metrics evaluator 234 and a probability metrics evaluator 236. The communication metrics evaluator 234 analyzes the communication metrics data received from the MS 114 and determines there were abnormal changes in any of the various communication metrics. As described above with respect to FIG. 4 and FIGS. 7-10, MS 114 routinely collects data, such as that illustrated in the table of FIG. 3, concerning operation of the MS 114 and its interaction with the serving base station (e.g., the BS 102) as well as data relating to neighboring base stations (e.g., neighbor RSSI and neighbor CINR). Upon session drop or disruption in the communication link with the serving base station, the MS 114 stores this data in the communication metrics storage area 214 (see FIG. 11). Upon reconnection of the MS 114 to the wireless communication network, the data stored in the communication metrics storage area 214 is transferred to the communication metrics evaluator 234. The communication metrics evaluator 234 determines which data values are abnormally low or abnormally high. As discussed above, the term "abnormal" refers to data values that are outside the range of data values for normal operation of the MS 114, the BS 102, and any neighboring base stations for which data was collected.

Similarly, the probability metrics evaluator 236 receives historical data from the moments leading up to the call disruption and determines whether unexpected changes in any of the call metrics data in those moments preceding call disruption were likely to have played a role in the call disruption. For example, the normal value for RSSI may range from −65 dbm to −80 dbm. If the RSSI for the MS 114 fell below −80 dbm several times in the moments leading up to the session drop, this increases the probability that a low value for the RSSI is a factor causing the session drop. Other changes in communication metrics data are evaluated by the probability metrics evaluator 236 in a similar manner. As previously discussed, in an exemplary embodiment, the probability metrics evaluator 236 may classify the probability in bands, such as High, Medium, and Low probability. A High probability indicates that a particular communication metric is more likely to have been related to call disruption than a probability value of Medium or Low. Similarly, a probability value of Medium indicates that a particular communication metric was more likely involved with call disruption than a communication metric having a probability value of Low.

A disruption processor 238 may receive output from the communication metrics evaluator 234 and probability metrics evaluator 236 to generate data indicative of the most likely cause of call disruption. For example, the data in FIG. 4 indicates the abnormal increases or decreases in the communication metrics, as determined by the communication metrics evaluator 234 while the probability value (e.g., High, Medium, and Low) ranges are generated by the probability metrics evaluator 236. The "X" in the various columns and rows are generated by the disruption processor 238 to indicate the most likely cause of the call disruption.

Those skilled in the art will appreciate that several of the components illustrated in FIG. 12 may be implemented in the form of instructions stored in the memory 222 and executed by the CPU 220. For example, the communication metrics evaluator 234, probability metrics evaluator 236, and disruption processor 238 may all be implemented as instructions stored in the memory 222 and executed by the CPU 220. However, these elements are illustrated as separate blocks in the functional block diagram of FIG. 12 because each performs a separate function.

The various elements in FIG. 12 are coupled together by a bus system 240. The bus system 240 may include an address bus, data bus, control bus, power bus, and the like. For the sake of clarity, those various buses are illustrated in FIG. 12 as the bus system 240.

Figure 13:
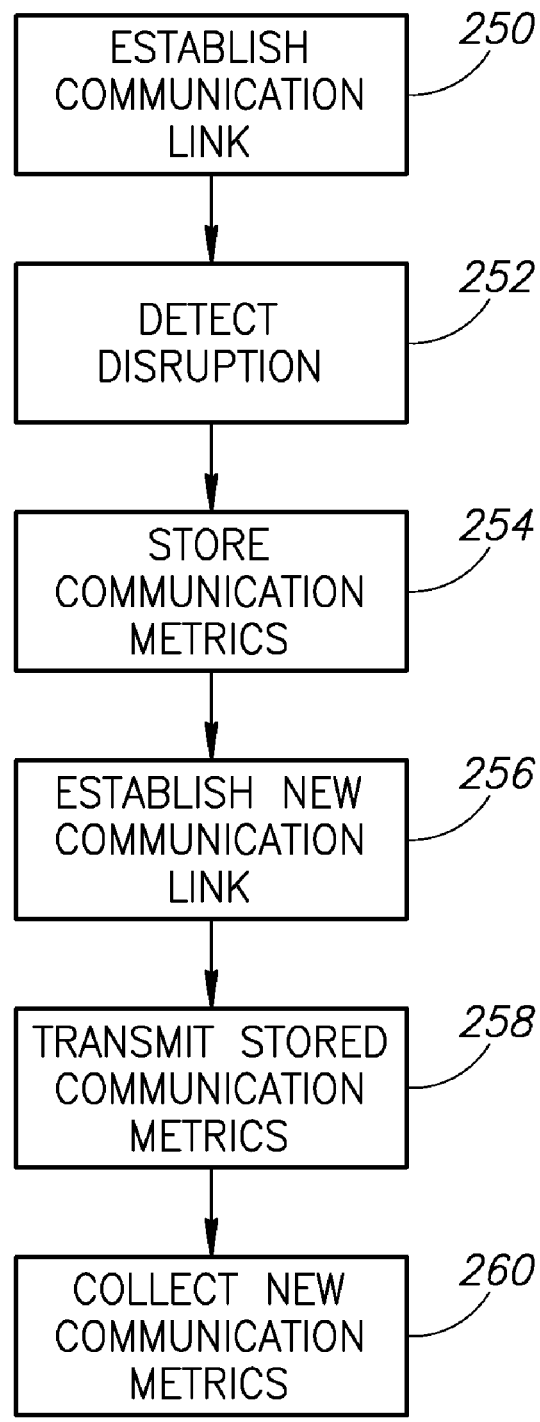
FIG. 13 is a flow chart illustrating the operation of a mobile station to store communication metrics data and to transmit the communication metrics data when a communication link is reestablished.

FIG. 13 is a flow chart illustrating the operation of the MS 114. At a step 250, the MS 114 establishes a communication link with a base station in the wireless network. For example, the MS 114 may establish a communication link with the BS 102. The initial establishment of a communication link between a mobile station and a base station is well known in the art and need not be described in greater detail herein.

In step 252, the MS 114 detects a disruption in the communication link with the serving base station (the BS 102) The various forms of disruption have been previously discussed. In a typical embodiment, the MS 114 detects disruption due to a lack of communication with the serving base station (e.g., the BS 102). As discussed above, the MS 114 may use the idle mode timer 212 (see FIG. 11) to detect the disruption of the communication link.

Upon detection of the disruption, the MS 114 may store the communication metrics in step 254. In one embodiment the communication metrics are stored in the communication metrics storage area 214 (see FIG. 11) when the MS 114 detects the disruption. In an alternative embodiment, the MS 114 stores current communication metrics in the communication metrics storage area 214 on an ongoing basis. In this embodiment, step 254 may be executed repeatedly prior to the detection of disruption in step 252. In this event, detection of disruption of the communication link would cause the MS 114 to secure the data in the communication metrics storage area 214 to prevent it from being overwritten. In either implementation, the communication metrics storage area 214 stores communication metrics that indicate the state of the MS 114 and near by base stations at the time that the communication link was disrupted.

In step 256, the MS 114 establishes a new communication link. As previously discussed, the new communication link in step 256 may be established with the previously serving base station (e.g., the BS 102) or with a new base station (e.g., the BS 106).

Once the new communication link has been established in step 256, the MS 114 transmits the stored communication metrics in step 258. Once the stored communication metrics has been received by the current base station, the MS 114 may resume normal communication and will begin collecting communication metrics data related to the new communication link in step 260. Thus, the MS 114 stores valuable data that reflects the state of the wireless communication network at the time the communication link with the MS 114 was disrupted. This data is automatically forwarded to the wireless network for evaluation.

Figure 14:
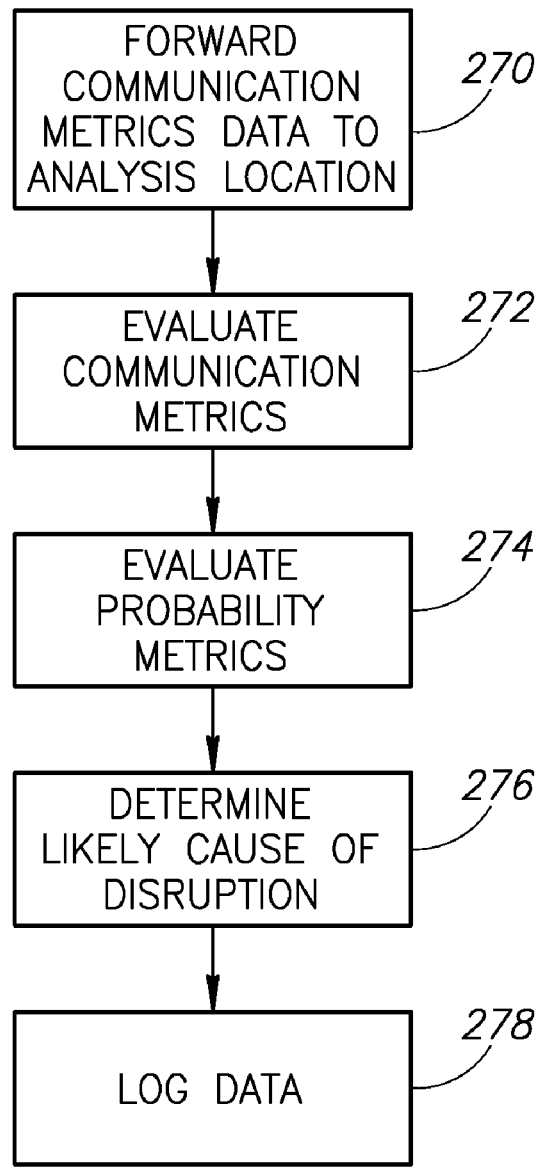
FIG. 14 is flow chart illustrating the operation of a system in analyzing the communication metrics data.

FIG. 14 is a flow chart illustrating the operation of the network in analyzing data to determine a likely cause for the disruption of the communication link. In step 270, the currently serving base station has received the communication metrics data from the MS 114 (see step 258 in FIG. 13). In step 270 the receiving base station forwards the received communication metrics data to the analysis location. In one embodiment, the previously serving base (e.g., the BS 102) may receive the data and perform the analysis to evaluate communication metrics and probability metrics. Alternatively, the receiving base station may forward the communication metrics data to a central location, such as the Element Management System, for analysis. Those skilled in the art will appreciate that the analysis of communication metrics and the generation of communication metrics data, probability metrics data, and the like, may be performed satisfactorily in almost any location in the communications network.

In step 272, the communication metrics evaluator 234 (see FIG. 12) analyzes the communication metrics to determine which of the specific elements were operating at abnormal levels at the time of link disruption. Those communication elements having abnormal values (either abnormally high or abnormally low) are identified in step 272.

In step 274, the probability metrics evaluator 236 (see FIG. 12) generates probability values associated with each of the communication metrics data elements. As previously discussed, the probability metrics data may be in the form of classes, such as High, Medium, and Low to indicate the relative probability of that particular communication metric data element being related to the cause of communication disruption.

In step 276, the disruption processor 238 (see FIG. 12) determines the likely cause of communication disruption. The disruption processor 238 utilizes both the abnormal values determined by the communication metrics evaluator 234 in step 272 as well as the probability metrics generated by the probability metrics evaluator 236 in step 274. The combination of these two factors identified which elements were more likely to lead to the call disruption. The combination of relevant factors is used by the disruption processor in Step 276 to determine whether the likely cause of call disruption is a coverage issue, and interference issue, a hardware failure, a back call capacity issue, or a core network issue.

In step 278, the disruption processor 238 may store the data in the form of a log. Those skilled in the art will appreciate that a communication disruption of a single mobile station a single time may have been caused by unknown and non-repeatable factors. For example, a lightning strike may have generated momentary RF interference that caused link disruption but would not require reconfiguration of the network. However, repeated failures in the form of numerous session drops, may be indicative of a communication network problem. The logged data may be used to determine whether any of the session drops are indicative of a correctable configuration in the communication network. Thus, the techniques described herein automatically collect and analyze data generated at the moment of disruption of a communication link and classify the relevance of the data to a particular cause of the disruption. This data may be logged and reviewed by the communication network operators to correct problems with the communications network and thus reduce overall session drops.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for diagnosing communication failures in a wireless communication network, comprising:
   establishing a first communication link between a mobile station and an initial base station, the first communication link being unintentionally disrupted;
   establishing a second communication link between the mobile station and a replacement base station;
   upon establishing the second communication link, automatically receiving a set of communication metrics from the mobile station via the second communication link;
   automatically analyzing the set of communication metrics to detect abnormal changes in selected ones of the communication metrics;
   automatically calculating a set of probabilities that a portion of the set of communication metrics are related to a reason for the disruption in the first communication link; and
   automatically determining a likely cause for the disruption in the first communication link based on analysis of the communication metrics and the calculated set of probabilities.

2. The method of claim 1 wherein the replacement base station is the initial base station and the second communication link is established between the mobile station and the initial base station.

3. The method of claim 1 wherein the replacement base station is a second base station different from the initial base station and the second communication link is established between the mobile station and the second base station.

4. The method of claim 3, further comprising forwarding the received set of communication metrics from the second base station to the initial base station wherein the initial base station automatically analyzes the set of communication metrics, automatically calculates the set of probabilities, and automatically determines the likely cause for the disruption.

5. The method of claim 1 wherein the automatic calculation of the set of probabilities comprises calculating a probability that each of the individual communication metrics is related to the reason for the disruption in the first communication link.

6. The method of claim 1 wherein the automatic calculation of the set of probabilities comprises calculating a probability classification that a portion of the set of communication metrics are related to the reason for the disruption in the first communication link.

7. The method of claim 6 wherein the calculation of the probability classification comprises calculating a low, medium, or high probability that the portion of the set of communication metrics are related to the reason for the disruption in the first communication link.

8. The method of claim 1 wherein the automatic calculation of the set of probabilities comprises analyzing changes in the set of communication metrics during a selected time period prior to the disruption of the first communication link.

9. The method of claim 8 wherein the automatic analysis of the set of communication metrics comprises calculating a probability for the set of communication metrics based on a number of changes in the set of communication metrics during the selected time period prior to the disruption of the first communication link.

10. The method of claim 8 wherein the automatic analysis of in the set of communication metrics comprises calculating a probability for the set of communication metrics based on a number of changes in the set of communication metrics in the selected time period prior to the disruption wherein a plurality of changes during the selected time period indicating worsening conditions for a first one of the set of communication metrics is assigned a higher probability than a probability for a second one of the set of communication metrics having a plurality of changes in the selected time period indicating no change in conditions for the second one of the set of communication metrics.

11. The method of claim 1 wherein the automatic calculation of the set of probabilities comprises determining the probability that a particular one of the communication metrics is related to the disruption of the first communication link based on an analysis of changes of the particular one of the communication metrics during a selected time period prior to the disruption of the first communication link.

12. The method of claim 1 wherein the automatic calculation of the set of probabilities comprises determining the probability that a first one of the set of communication metrics is related to the disruption of the first communication link based on a number of changes of the first one of the set of communication metrics during a selected time period prior to the link disruption wherein a plurality of changes during the selected time period indicating worsening conditions for the first one of the set of communication metrics is assigned a higher probability than a probability for a second one of the set of communication metrics having a plurality of changes during the selected time period indicating no change in conditions for the second one of the set of communication metrics.

13. The method of claim 1 wherein analyzing the set of communication metrics comprises detecting a change in each of the communication metrics beyond a normal range of expected values for the respective communication metric.

14. A method for generating data for diagnosing communication failures in a wireless communication network, comprising:
   establishing a first communication link between a mobile station and an initial base station, the first communication link being unintentionally disrupted;
   creating a set of current communication metrics within the mobile unit;
   saving the set of current communication metrics in a storage location within the mobile station as a result of disruption of the first communication link;
   establishing a second communication link between the mobile station and a replacement base station; and
   upon establishing the second communication link, automatically transmitting the stored set of communication metrics from the mobile station to the replacement base station using the second communication link;
   wherein the transmitted communication metrics are automatically analyzed for abnormalities and a set of probabilities calculated to indicate a probability that a portion of the set of communication metrics is a likely cause for the disruption in the first communication link.

15. The method of claim 14 wherein the replacement base station is the initial base station and the second communication link is established between the mobile station and the initial base station.

16. The method of claim 14 wherein the replacement base station is a second base station different from the initial base station and the second communication link is established between the mobile station and the second base station.

17. The method of claim 14 wherein a first portion of the set of communication metrics comprises data related to operation of the mobile station.

18. The method of claim 17 wherein a second portion of the set of communication metrics comprises data related to operation of a neighbor base station in geographic proximity to the initial base station.

19. A system for diagnosing communication failures in a wireless communication network, comprising:
a first base station configured to communicate with a mobile station via a first communication link;
a replacement base station configured to communicate with the mobile station via a second communication link at a time following a disruption of the first communication link; and
a processor configured to receive a set of communication metrics received from the mobile station via the second communication link, the set of communication metrics being stored by the mobile station at the time of disruption of the first communication link, the processor being further configured to analyze the received set of communication metrics to determine abnormal changes in individual ones of the set of communication metrics, and to analyze a set communication parameters corresponding to the set of communication metrics to determine a probability that a particular one of the communication parameters is related to the link disruption, the processor being further configured to determine a likely cause for the disruption based on the received communication metrics and the determined probability.

20. The system of claim 19 wherein the replacement base station is the first base station and the second communication link is established between the mobile station and the first base station.

21. The system of claim 19 wherein the replacement base station is a second base station different from the first base station and the second communication link is established between the mobile station and the second base station.

22. The system of claim 21, further comprising a network communication link in the second base station configured to forward the received set of communication metrics from the second base station to the first base station wherein the processor configured to receive the set of communication metrics received from the mobile station is located in the first base station.

23. The system of claim 19 wherein the processor determines the probability that a particular one of the communication parameters is related to the link disruption based on an analysis of changes of the particular one of the communication parameters prior to the link disruption.

24. The system of claim 19 wherein the processor determines the probability that a first one of the communication parameters is related to the link disruption based on a number of changes of the first one of the communication parameters during a selected time period prior to the link disruption wherein a plurality of changes during the selected time period indicating worsening conditions for the first one of the set of communication metrics is assigned a higher probability than a probability for a second one of the set of communication metrics having a plurality of changes during the selected time period indicating no change in conditions for the second one of the set of communication metrics.

25. The system of claim 19 wherein the processor is configured to analyze the received set of communication metrics to determine the abnormal changes by analyzing the set of communication metrics to detect a change in each of the set of communication metrics beyond a normal range of expected values for the respective communication metric.

26. A mobile station operable to generate data for diagnosing communication failures in a wireless communication network, comprising:
a transceiver configured to communicate with an initial base station using a first communication link between the mobile station and the initial base station
a processor configured to detect a disruption of the first communication link;
a data storage area configured to store set of communication metrics within the mobile unit substantially contemporaneous with the disruption of the first communication link;
the transceiver being further configured to communicate with a replacement base station using a second communication link between the mobile station and the replacement base station, upon establishment of the second communication link between the mobile station and the replacement base station, transmitting the stored set of communication metrics from the mobile station to the replacement base station using the second communication link wherein the transmitted communication metrics are analyzed for abnormalities and a set of probabilities calculated to indicate a probability that a portion of the set of communication metrics are a likely cause for the disruption in the first communication link.

27. The apparatus of claim 26 wherein the replacement base station is the initial base station and the transceiver is further configured to communicate with the initial base station using the second communication link between the mobile station and the initial base station.

28. The apparatus of claim 26 wherein the replacement base station is a second base station different from the initial base station and the transceiver is further configured to communicate with the second base station using the second communication link between the mobile station and the second base station.

* * * * *